United States Patent [19]

Tokairin et al.

[11] Patent Number: 4,710,884
[45] Date of Patent: Dec. 1, 1987

[54] DEVICE FOR COMPENSATING FOR DEFLECTION IN A PLIABLE POSITIONING APPARATUS

[75] Inventors: Hiroaki Tokairin; Kazuo Honma; Kichio Nakajima; Kiyoshi Nagasawa; Takeshi Aritake, all of Ibaraki, Japan

[73] Assignee: Hitachi Construction Machinery Co., Ltd., Tokyo, Japan

[21] Appl. No.: 809,908

[22] Filed: Dec. 17, 1985

[30] Foreign Application Priority Data

Dec. 19, 1984 [JP] Japan ............................ 59-266370

[51] Int. Cl.$^4$ .................... G06F 15/46; G05B 19/42
[52] U.S. Cl. ................................ 364/513; 364/176; 901/48
[58] Field of Search .................. 364/513, 170, 176; 901/45, 48, 50; 318/568

[56] References Cited

U.S. PATENT DOCUMENTS

| 4,243,923 | 1/1981 | Whitney et al. | 318/646 |
| 4,362,978 | 12/1982 | Pollard et al. | 318/632 |
| 4,530,062 | 7/1985 | Inaba et al. | 901/48 |

*Primary Examiner*—Jerry Smith
*Assistant Examiner*—Allen MacDonald
*Attorney, Agent, or Firm*—Antonelli, Terry & Wands

[57] ABSTRACT

A working structure having a support and an arm assembly pivotally connected to the support. The arm assembly includes at least two arm members pivotally connected to each other and each pivotally moved by a respective actuator. The second arm member has an external load applied to its front end or working point. The apparatus includes angle sensors for sensing pivoting angles of the respective arm members, load sensors for sensing the external load, target position indication device for indicating the coordinate target position of the working point, and a control unit including a deflection calculation section responsive to signals produced by the angle sensor means and load sensor means for calculating a deflection of the arm assembly at the working point, pivoting angle calculation section responsive to signals produced by the target position indication device for calculating provisional pivoting angles for the arm members corresponding to the target position when the arm assembly is assumed to produce no deflection, and correcting angle calculation section responsive to signals produced by the deflection calculation section and pivoting angle calculation sections for calculating, as correcting angles, the pivoting angles for the respective arm members corresponding to the deflection in the position of the provisional pivoting angles such that the first and second actuators are actuated based on the signals from the pivoting angle calculation and correcting angle calculation sections to pivotally move the first and second arm members to correct any error caused by the deflection of the arm assembly.

8 Claims, 7 Drawing Figures

DEVICE FOR COMPENSATING FOR DEFLECTION IN A PLIABLE POSITIONING APPARATUS

BACKGROUND OF THE INVENTION

This invention relates to a working apparatus of pliable structure, such as a cargo handling apparatus with a multiple degree of freedom, a robot, etc., which is equipped with an arm assembly having a plurality of arms connected together for pivotal movement.

To save labor and cope with diversification of workload in assembling and construction workstations, there has in recent years been an increasing demand for a working apparatus equipped with an arm assembly having a plurality of arms with a multiple degree of freedom. Meanwhile, one of the problems which manufacturers encounter nowadays in reducing production costs is how to obtain a light weight of this type of working apparatus.

Under these circumstances, assembling robots and coating robots have in recent years been introduced. These robots have relatively short arms which are about 2 to 3 meters in length, and no great influences are exerted on production costs even if a rigid structure with little deflection is adopted to increase the precision and accuracy with which the arms are positioned.

However, in working apparatus such as construction machines, an arm assembly having a plurality of arms of large length which are 20 to 30 meters in length and have a plurality of joints is required to handle articles of heavy weight. In this type of working apparatus, it is impossible to adopt a rigid structure as is the case with the assembling and coating robots referred to hereinabove, because the size of the arms would have to be increased and an increase in the size of the arms would require an increase in the size of actuators for driving the arms. This would inevitably result in a rise in production costs. After all, the use of a rigid structure in this type of working apparatus would be economically unfeasible. This has prompted one to try to adopt a pliable structure for a working apparatus in which the arms have minimized dimensions (including the width). The problem encountered in working apparatus of pliable structure is that difficulty is experienced in achieving a high degree of precision and accuracy in positioning the arms because of the possibility of inevitable deflection of the arms.

SUMMARY OF THE INVENTION

This invention has been developed for the purpose of obviating the aforesaid problem in adopting a pliable structure for a working apparatus. Accordingly, the invention has as its object the provision of a working apparatus of pliable structure which is capable, by accommodating a deflection of each arm, of achieving the positioning of the arms with a high degree of precision and accuracy during operation of the working apparatus.

To accomplish the aforesaid object, there is provided according to the invention a working apparatus of pliable structure having a support and an arm assembly pivotally connected to said support, said arm assembly including at least a first arm member and a second arm member pivotally connected to each other and pivotally moved by a first actuator and a second actuator, respectively, at least said second arm member having an external load applied to its front end or working point, wherein the apparatus comprises: angle sensor means for sensing pivoting angles of the first arm member and second arm member, respectively; load sensor means for sensing the external load applied to the front end or working point of the second arm member; target position indication means for indicating coordinate values of a target position of working point of the second arm member; and control means including deflection calculation means for inputting signals produced by the angle sensor means and load sensor means and calculating a deflection of the arm assembly at the working point of the second arm member; pivoting angle calculation means for inputting signals produced by the target position indication means and calculating provisional pivoting angles for the first arm member and second arm member corresponding to the target position when the arm assembly is assumed to produce no deflection; and correcting angle calculation means for inputting signals produced by the deflection calculation means and pivoting angle calculation means and calculating, as correcting angles, pivoting angles for the first arm member and second arm member corresponding to the deflection in the position of the provisional pivoting angles whereby the first actuator and second actuator are actuated based on the signals produced by the pivoting angle calculation means and correcting angle calculation means to pivotally move the first arm member and second arm member, respectively, to thereby correct an error caused by the deflection of the arm assembly in positioning the working point of the second arm member for achieving accurate positioning thereof at the target position.

In the working apparatus of pliable structure, the control means may further include means for inputting the signals produced by the pivoting angle calculation means and correcting angle calculation means and calculating corrected pivoting angles for the first arm member and second arm member, respectively, which permit the working point of the second arm member to be positioned at said target position, whereby the first actuator and second actuator are actuated by signals indicative of said corrected pivoting angles to thereby correct the positioning error caused by the deflection of the arm assembly while pivotally moving the first arm member and second arm member.

In the working apparatus of pliable structure, it may further comprise correction initiation indication means for starting correction of the positioning error caused by the deflection of the arm assembly, whereby the first arm member and second arm member are first pivotally moved by the signal produced by the pivoting angle calculation means and then they are pivotally moved by the signal produced by the correcting angle calculation means to correct the positioning error after the pivotal movement of the first and second arm members caused by the first signal has been terminated.

DESCRIPTION OF THE PREFERRED EMBODIMENTS

Figure 1:
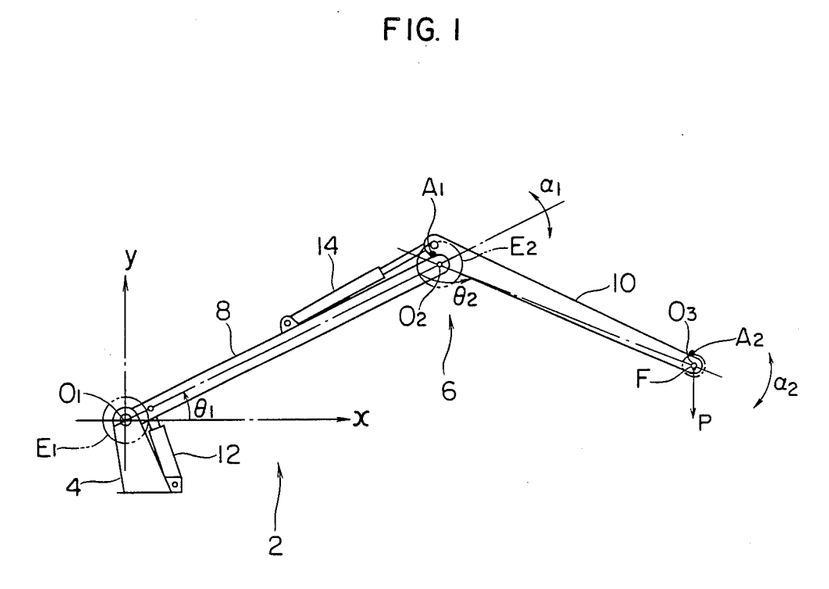
FIG. 1 is a side view of the working apparatus of pliable structure comprising one embodiment of the invention, showing the arm assembly mounted thereon.

FIG. 1, the reference numeral 2 designates a working apparatus of a pliable structure comprising one embodiment of the invention. The working apparatus of pliable structure 2 comprises a support 4 held stationary, and an arm assembly 6 pivotally mounted by the support 4 and comprising a plurality of arm members or a first arm member 8 and a second arm member 10, for example. The first arm member 8 is connected through a pin to the support 4 for pivotal movement about a point $O_1$, and the second arm member 10 is connected through a pin to the first arm member 8 for pivotal movement about a point $O_2$. An external load P is applied to a point $O_3$ at a front end or working point of the second arm member 10. The first arm member 8 and second arm member 10 are constructed such that they each are of light weight and produce a deflection which is not negligible. The first arm member 8 is pivotally moved with respect to the mount 4 by a hydraulic cylinder 12 connected to the support 4, and the second arm member 10 is pivotally moved with respect to the first arm member 8 by a hydraulic cylinder 14 connected to the first arm member 8. An angle gauge $E_1$ is located at the point $O_1$ about which the first arm member 8 is pivotally moved with respect to the support 4 for sensing a pivoting angle of the arm assembly 6 or a pivoting angle $\theta_1$ of the first arm member 8 with respect to the horizontal extending through the point $O_1$. An angle gauge $E_2$ is located at the point $O_2$ about which the second arm member 10 is pivotally moved with respect to the first arm member 8 for sensing a relative angle $\theta_2$ between the first arm member 8 and second arm member 10. An accelerometer $A_1$ is located at a forward end of the first arm member 8 to sense an acceleration $\alpha_1$ at that portion. An accelerometer $A_2$ is located at a forward end of the second arm member 10 to sense an acceleration $\alpha_2$ at that portion. A force sensor F is located at the point $O_3$ at which an external load P is applied to the working point of the second arm member 10 by a cargo suspended therefrom to sense the external load P.

Figure 2:
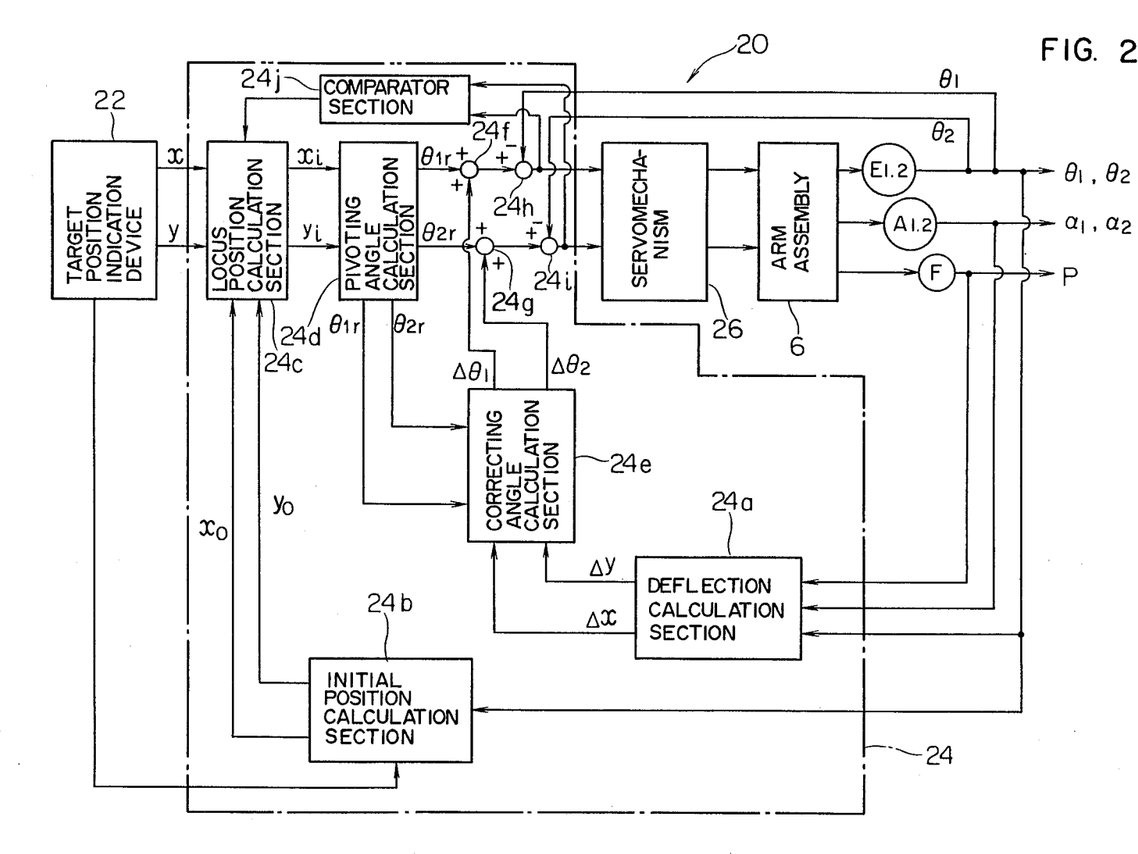
FIG. 2 is a block diagram showing the control system for positioning the front end or working point of the second arm of the arm assembly of the working apparatus shown in FIG. 1.

The angle gauges $E_1$ and $E_2$, accelerometers $A_1$ and $A_2$ and force sensor F are arranged in a manner to constitute parts of a positioning control system 20 shown in FIG. 2. The control system 20 comprises a target position indication device 22 operative to produce a signal for indicating a target position of the external load applied point $O_3$ at the working point of the second arm member 10 in the form of signals indicative of the coordinate values (x, y) of an x-y coordinate system having its origin at the point $O_1$. The signal x, y produced by the indication device 22 is delivered into a control unit 24 for correcting an error caused by the deflection of the arm assembly 6 in positioning the working point of the second arm member 10.

The control unit 24 comprises a deflection calculation section 24a connected to the angle gauges $E_1$ and $E_2$, accelerometers $A_1$ and $A_2$ and force sensor F for inputting signals $\theta_1$, $\theta_2$, $\alpha_1$, $\alpha_2$, and P therefrom to calculate a deflection at the external load applied point $O_3$ as values $\Delta x$ and $\Delta y$ of the x- and y-direction components of the x-y coordinate system, an initial position calculation section 24b connected to the angle gauges $E_1$ and $E_2$ and target position indication device 22 for inputting signals produced by the angle gauges $E_1$ and $E_2$ when the device 22 produces the signal x, y for indicating the target position and calculating an initial position of the external load applied point $O_3$ as coordinate values ($x_o$, $y_o$) of the x-y coordinate system, and a locus position calculation section 24c connected to the target position indication device 22 and initial position calculation section 24b for inputting signals therefrom for calculating a multiplicity of instantaneous target positions of the external load applied point $O_3$, which may be N in number, for example, located on a locus between the initial position and target position as coordinate values ($x_i$, $y_i$) (i=1, 2, 3 ... N) of the x-y coordinate system.

The signal $x_i$, $y_i$ produced by the locus position calculation section 24c is supplied to a pivoting angle calculation section 24d which, based on this signal, calculates provisional pivoting angles $\theta_{1r}$ and $\theta_{2r}$ for the first arm member 8 and second arm member 10 corresponding to instantaneous target positions $x_i$ and $y_i$ when the arm assembly 6 is assumed to be a rigid structure producing no deflection. Meanwhile, the signal $\Delta x$, $\Delta y$ produced by the deflection calculation section 24a is supplied, together with the signal $\theta_{1r}$, $\theta_{2r}$ produced by the pivoting angle calculation section 24d, to a correcting angle calculation section 24e which, based on these signals, calculates correcting angle $\Delta \theta_1$ and $\Delta \theta_2$ for the first arm member 8 and second arm member 10 corresponding to deflections $\Delta x$ and $\Delta y$ in the position of the provisional angles $\theta_{1r}$ and $\theta_{2r}$, respectively. The signals produced by the pivoting angle calculation section 24d and correcting angle calculation section 24e are supplied to adders 24f and 24g which calculate corrected pivoting angles $\theta_{1r}+\Delta \theta_1$ and $\theta_{2r}+\Delta \theta_2$ for the first arm member 8 and second arm member 10.

The adders 24f and 24g produce outputs which are supplied to feedback adders 24h and 24i, respectively, which calculate differences between the corrected pivoting angles $\theta_{1r}+\Delta \theta_1$ and $\theta_{2r}+\Delta \theta_2$ and the actual pivoting angles $\theta_1$ and $\theta_2$ of the first arm member 8 and second arm member 10 sensed by the angle gauges $E_1$ and $E_2$, respectively, and supply difference signals to a servomechanism 26. The servomechanism 26 which may be composed of the hydraulic cylinders 12 and 14, servo valves and electromagnetic proportional valves, not shown, is driven by the signals from the adders 24h and 24i so as to cause the hydraulic cylinders 12 and 14 to act in a manner to bring the pivoting angles of the first arm member 8 and second arm member 10 into coincidence with the corrected pivoting angles $\theta_{1r}+\Delta \theta_1$ and $\theta_{2r}+\Delta \theta_2$, respectively.

The outputs produced by the adders 24h and 24i are also supplied to a comparator section 24j which determines whether or not the differences $(\theta_{1r}+\Delta \theta_1)-\theta_1$ and $(\theta_{2r}+\Delta \theta_2)-\theta_2$ between the corrected pivoting angles and the actual angles sensed by the angle gauges $E_1$ and $E_2$ are smaller than an allowance $\Delta \theta_a$. When the result obtained is $(\theta_{1r}+\Delta \theta_1)-\theta_1 < \Delta \theta_a$ and $(\theta_{2r}+\Delta\theta_2)-\theta_2 < \Delta\theta_a$, the comparator section 24j produces a renewal signal which is supplied to the locus position calculation section 24c which, upon receipt of this signal, switches the signal indicating the instantaneous target position $x_i$, $y_i$ to a new signal indicating the next following instantaneous target position $x_{i+1}$, $y_{i+1}$, so that control is effected based on the renewed signals to correct an error in the positioning of the first arm member 8 and second arm member 10. The locus position calculation section 24c stops producing signals when the instantaneous target position reaches the final position $x_n$, $y_n$, thereby terminating a positioning control operation. Thus, the control unit 24 operates such that the positioning error caused by the deflection of the arm assembly 6 can be corrected while the first arm member 8 and second arm member 10 are being pivotally moved, thereby accurately positioning the external load applied point $O_3$ at the target position.

The principle of calculations done at the deflection calculation section 24a of the control unit 24 will be described by referring to FIGS. 3 and 4.

Figure 3:
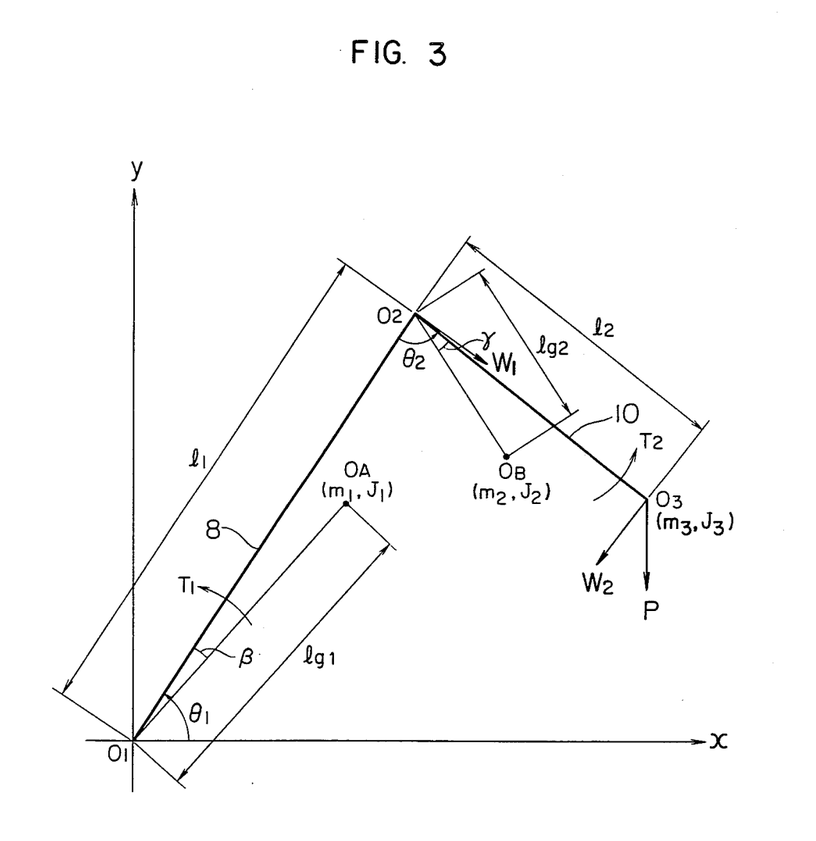
FIGS. 3 and 4 are schematic views each showing the arm assembly of FIG. 1 as a model and indicating the quantity of state, in explanation of the arithmetic operation performed by the control unit of the system shown in FIG. 2.

Referring to FIG. 3, let the torque acting on the point $O_1$ and the torque acting on the point $O_2$ when the first arm member 8 and second arm member 10 are pivotally moved be denoted by $T_1$ and $T_2$, respectively. Then, the torques $T_1$ and $T_2$ can be expressed as follows utilizing Lagrangian equation of motion:

$$T_1 = [J_1 + J_2 + J_3 + m_1 l_{g1}^2 + m_2\{l_1^2 + l_{g2}^2 - 2l_1 l_{g2}\cos(\theta_2 - \gamma)\} + m_3(l_1^2 + l_2^2 - 2l_1 l_2\cos\theta_2)]\ddot{\theta}_1 + [J_2 + J_3 + m_2\{l_{g2}^2 - l_1 l_{g2}\cos(\theta_2 - \gamma)\} + m_3(l_2^2 - l_1 l_2\cos\theta_2)]\ddot{\theta}_2 + \{m_2 l_1 l_{g2}\sin(\theta_2 - \gamma) + m_3 l_1 l_2\sin\theta_2\}(2\dot{\theta}_1 + \dot{\theta}_2)\dot{\theta}_2 + g\{m_1 l_{g1}\cos(\theta_1 - \beta) + (m_2 + m_3)l_1\cos\theta_1 - m_2 l_{g2}\cos(\theta_1 + \theta_2 - \gamma) - m_3 l_2\cos(\theta_1 + \theta_2)\} \quad (1)$$

$$T_2 = (J_2 + J_3 + m_2 l_{g2}^2 + m_3 l_2^2)\ddot{\theta}_2 + [J_2 + J_3 + m_2\{l_{g2}^2 - l_1 l_2\cos(\theta_2 - \gamma)\} + m_3(l_2^2 - l_1 l_2\cos\theta_2)]\ddot{\theta}_2 - \{m_2 l_1 l_{g2}\sin(\theta_2 - \gamma) + m_3 l_1 l_2\sin\theta_2\}\dot{\theta}_1^2 + g\{m_2 l_{g2}\cos(\theta_1 + \theta_2 - \beta) + m_3 l_2\cos(\theta_1 + \theta_2)\} \quad (2)$$

where:
$J_1$: the moment of inertia of first arm member 8.
$J_2$: the moment of inertia of second arm member 10.
$J_3$: the moment of inertia of external load.
$m_1$: the mass of first arm member 8.
$m_2$: the mass of second arm member 10.
$m_3$: the mass of external load.
$l_1$: the fundamental length of first arm meber 8 (the distance between the points $O_1$ and $O_2$).
$l_2$: the fundamental length of second arm member 10 (the distance between the points $O_2$ and $O_3$).
$l_{g1}$: the distance between the point $O_1$ and the position of the center of gravity $O_A$ of first arm member 8.
$l_{g2}$: the distance between the point $O_2$ and the position of the center of gravity $O_B$ of second arm member 10.
$\beta$: the deviation angle of the position of the center of gravity $O_A$ of first arm member 8 with respect to the point $O_1$.
$\gamma$: the deviation angle of the position of the center of gravity $O_B$ of second arm member 10 with respect to the point $O_2$.
g: gravitational acceleration.

In the above values, $J_1$, $J_2$, $J_3$, $m_1$, $M_2$, $l_1$, $l_2$, $l_{g1}$, $l_{g2}$, $\beta$, $\gamma$ and g are known and constant. The value $m_3$ is given by P/g and thus can become known by sensing P.

The relations $\alpha_1 = l_1\ddot{\theta}_1$ and $\alpha_2 = l_2\ddot{\theta}_2$ exist between the accelerations $\alpha_1$ and $\alpha_2$ and the angular velocities $\ddot{\theta}_1$ and $\ddot{\theta}_2$ at the points $O_2$ and $O_3$. Thus, it is possible to obtain $\ddot{\theta}_1$ and $\ddot{\theta}_2$ by sensing $\alpha_1$ and $\alpha_2$. The angular velocities $\dot{\theta}_1$ and $\dot{\theta}_2$ can be obtained by differentiating the signals $\theta_1$ and $\theta_2$ of the angle gauges $E_1$ and $E_2$, respectively.

Thus, the sum $W_1$, $W_2$ of the dynamic loads acting on the points $O_2$ and $O_3$ at the working points of the first arm member 8 and second arm member 10 and the loads applied thereto by the weights of arm members can be obtained if one divides by the lengths $l_1$ and $l_2$ of the first arm member 8 and second arm member 10 the torques $T_1$ and $T_2$ obtained by the equations (1) and (2), respectively, as follows:

$$W_1 = T_1/l_1$$

$$W_2 = T_2/l_2$$

Thus, the deflection $V_2$ produced at the point $O_3$ at the working point of the second arm member 10 by the sum $W_2$ of the dynamic load and the static load applied to the point $O_3$ can be obtained by the following equation:

$$V_2 = \{W_2/3EI_2\}l_2^3 \quad (3)$$

Consequently, the value of $V_2$ can be obtained.

The deflection $V_1$ produced at the point $O_2$ at the working point of the first arm member 8 by the sum $W_1$ of the dynamic load the static load applied to the point $O_2$ can be obtained by the following equation:

$$V_1 = \{W_1/3EI_1\}l_1^3 \quad (4)$$

Figure 4:
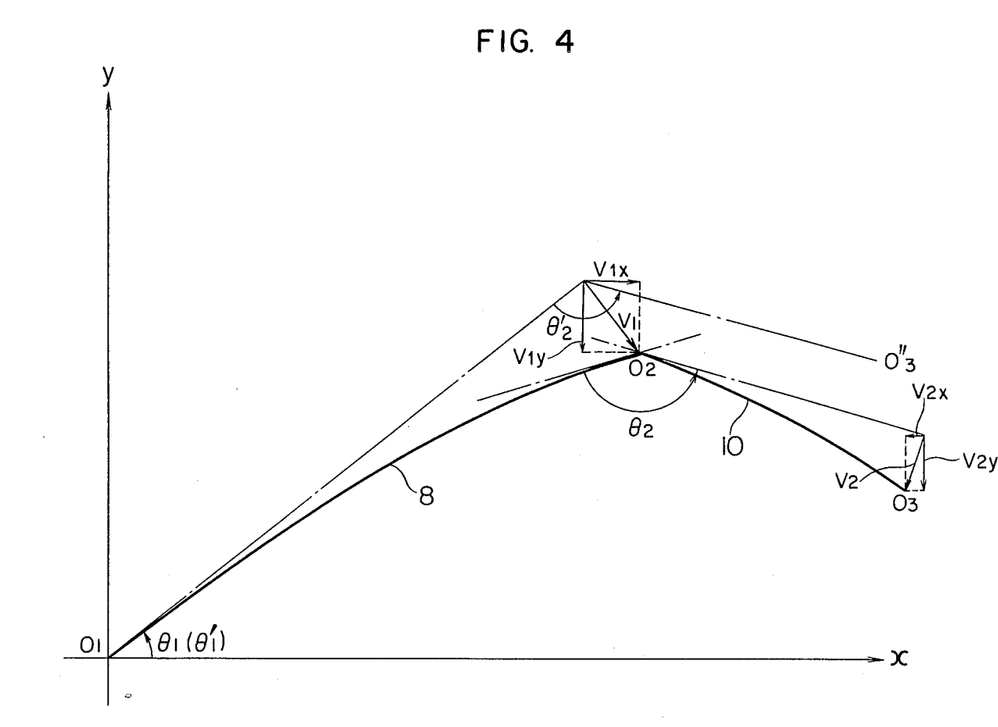

In FIG. 4, the target position of the point $O_3$ which is the external load applied point of the second arm member 10 is set at a point $O''_3$, and the pivoting angles of the first arm member 8 and second arm member 10 for bringing the point $O_3$ to the target position $O''_3$ are set at $\theta_1'$ and $\theta_2'$, respectively, when the first arm member 8 and second arm member 10 are assumed to produce no deflection. In actual practice, however, the first arm member 8 and second arm member 10 produces deflections as described hereinabove. As a result, the first arm member 8 and second arm member 10 are actually located in a position lower than their target positions, and the deflections $V_1$ and $V_2$ can be obtained by the equations (3) and (4), respectively, as described hereinabove. Also, $\theta_1' \approx \theta_1$ and $\theta_2' \approx \theta_2$.

Thus, the x- and y-coordinates of the deflections $V_1$ and $V_2$ in the x-y coordinate system which may be denoted by $V_{1x}$, $V_{1y}$, $V_{2x}$ and $V_{2y}$ can be expressed as follows:

$$V_{1x} = V_1 \sin\theta_1' \approx V_1 \sin\theta_1$$

$$V_{1y} = V_1 \cos\theta_1' \approx V_1 \cos\theta_1$$

$$V_{2x} = -V_2 \cos(\theta_2' + \theta_1' - \pi/2) \approx -V_2 \sin(\theta_1 + \theta_2)$$

$$V_{2y} = -V_2 \sin(\theta_1' + \theta_2' - \pi/2) \approx V_2 \cos(\theta_1 + \theta_2)$$

Thus, the deflection $\Delta x$ in the x-direction and the deflection $\Delta y$ in the y-direction at the point $O_3$ can be obtained by the following equations:

$$\Delta x = V_{1x} + V_{2x} = V_1 \sin \theta_1 - V_2 \sin(\theta_1 + \theta_2) \quad (5)$$

$$\Delta y = V_{1y} + V_{2y} = V_1 \cos \theta_1 + V_2 \cos(\theta_1 + \theta_2) \quad (6)$$

In this way, the deflections $\Delta x$ and $\Delta y$ are calculated at the deflection calculation section 24a.

In the locus position calculation section 24c of the control unit 24, the coordinate values $(x_i, y_i)$ of the instantaneous positions are obtained by calculating the difference between the coordinate values $(x_o, y_o)$ of the initial positions and the coordinate values $(x, y)$ of the target positions and dividing the difference into N portions. That is, the values of $x_i$, $y_i$ are obtained by the following equations:

$$x_i = x_{i-1} + \frac{x - x_o}{N}$$

$$y_i = y_{i-1} + \frac{y - y_o}{N}$$

Calculation is done as follows in the pivoting angle calculation section 24d. Let us assume that the external load applied point $O_3$ is located in the instantaneous target position $(x_i, y_i)$, and let the angle formed by the line $\overline{O_1O_3}$ connecting the points $O_1$ and $O_3$ together and the first arm member 8 and the angle formed by the line $\overline{O_1O_3}$ and the x-axis be denoted by $b_1$ and $b_2$ respectively. Then, with regard to the line $\overline{O_1O_3}$, the following relation holds:

$$\overline{O_1O_3} = x^2_i + y^2_i$$

With regard to the triangle $O_1O_2O_3$, the following relation holds based on the cosine theorem:

$$l_2^2 = l_1^2 + \overline{O_1O_3}^2 - 2l_1 \cdot \overline{O_1O_3} \cdot \cos b_1$$

Thus, the following equation can be obtained:

$$b_1 = \cos^{-1}\left(\frac{l_1^2 + (x_i^2 + y_i^2) - l_2^2}{2l_1 \cdot (x_i^2 + y_i^2)^{\frac{1}{2}}}\right)$$

Since $\tan b_2 = y_i/x_i$, $b_2$ can be expressed as follows:

$$b_2 = \tan^{-2}(y_i/x_i)$$

Since $\theta_{1r} = b_1 + b_2$, $\theta_{1r}$ can be obtained from the following equation:

$$\theta_{1r} = \cos^{-1}\left(\frac{l_1^2 + (x_i^2 + y_i^2) - l_2^2}{2l_1 \cdot (x_i^2 + y_i^2)^{\frac{1}{2}}}\right) + \tan^{-1}\left(\frac{y_i}{x_i}\right)$$

Likewise, the following relation holds based on the cosine theorem with regard to the triangle $O_1O_2O_3$:

$$\overline{O_1O_3}^2 = l_1^2 + l_2^2 - 2l_1l_2 \cos \theta_{2r}$$

Thus, $\theta_{2r}$ is given by $$\theta_{1r} = \cos^{-1}\left(\frac{l_1^2 + l_2^2 - (x_i^2 + y_i^2)}{2l_1l_2}\right)$$

In the correcting angle calculation section 24e, calculation is done as follows:

As signals $\theta_{1r}$ and $\theta_{2r}$ are produced by the pivoting angle calculation section 24d, the coordinate values $(x, y)$ of the external load applied point $O_3$ are given as follows:

$$\Delta x = f_1(\theta_{1r}, \theta_{2r}) \quad (7)$$

$$\Delta y = f_2(\theta_{1r}, \theta_{2r}) \quad (8)$$

Generally, if the errors of $X_1$, $X_2$, $X_3$ are expressed as $\Delta X_1$, $\Delta X_2$, $\Delta X_3$ with regard to functions expressed as $Y = f(X_1, X_2, X_3 \ldots)$, then the error $\Delta Y$ of Y can be expressed as follows:

$$\Delta Y = (\partial f/\partial X_1) \cdot \Delta X_1 + (\partial f/\partial X_2) \cdot \Delta X_2 + (\partial f/\partial X_3) \cdot \Delta X_3 \cdot \Delta X_3 + \ldots$$

When this relation is applied to the equations (7) and (8), the following equations are obtained:

$$\Delta x = (\partial f_1/\partial \theta_{1r}) \cdot \Delta \theta_1 + (\partial f_1/\partial \theta_{2r}) \cdot \theta_2 \quad (9)$$

$$\Delta y = (\partial f_x/\partial \theta_{2r}) \cdot \Delta \theta_2 + (\partial f_2/\partial \theta_{2r}) \cdot \Delta \theta_2 \quad (10)$$

By substituting the $\Delta x$ and $\Delta y$ of the equations (5) and (6) into the equations (9) and (10) respectively, $\Delta \theta_1$ and $\Delta \theta_2$ can be obtained. The $\Delta \theta_1$ and $\Delta \theta_2$ obtained in this way are outputted to the adders 24f and 24g from the correcting angle calculation section 24e.

In the embodiment shown and described hereinabove, the calculation sections 24a–24e and the comparator section 24j of the control unit 24 can be implemented by logic circuits. They can also be realized by using a microcomputer. The control unit as a whole can be realized by using a microcomputer.

An operation program for the control unit 24 to be used when it is realized by using a microcomputer will be described by referring to the flow charts shown in FIGS. 5 and 6.

Figure 5:
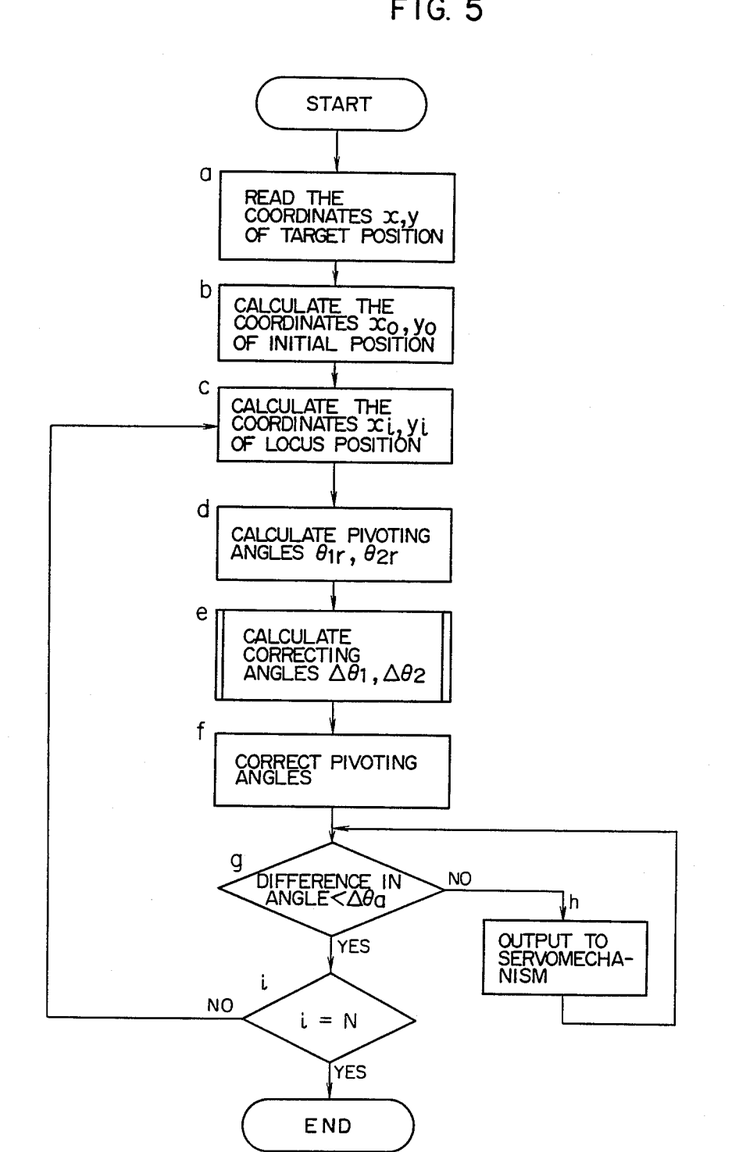
FIG. 5 is a flow chart in explanation of the program used when the control unit shown in FIG. 2 is realized by means of a microcomputer.
Figure 6:
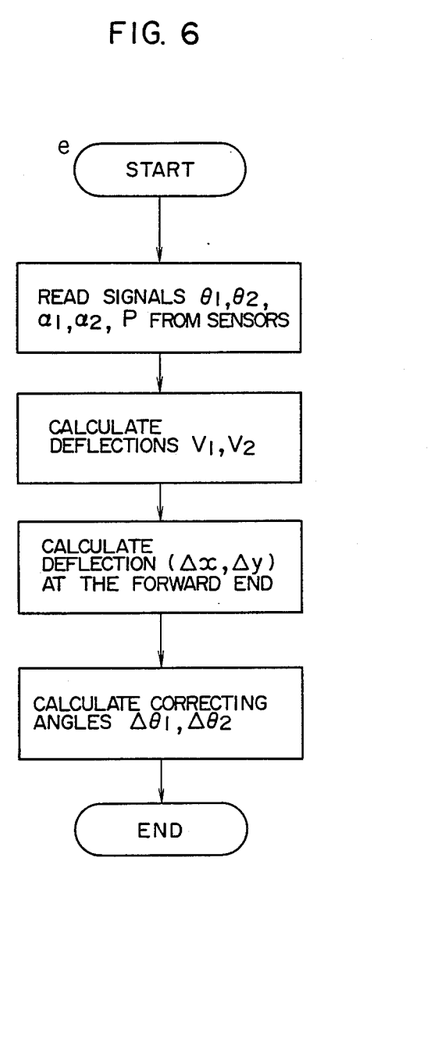
FIG. 6 is a flow chart showing in detail the steps of the flow chart shown in FIG. 5.

In step a shown in FIG. 5, the coordinate values $(x, y)$ of the target position indicated by the target position indication device 22 are read out. In step b, the coordinate values $(x_o, y_o)$ of the initial position are calculated based on the outputs $\theta_1$ and $\theta_2$ of the angle gauges $E_1$ and $E_2$ when a signal indicative of the target position is produced by the device 22. Then, in step c, based on the coordinate values $(x, y)$ of the target position and the coordinate values $(x_o, y_o)$ of the initial position, the ith coordinate values $(x_i, y_i)$ out of those of the multiplicity of instantaneous target positions on the locus between the initial position and the target position are calculated. The manner of the calculation done in this step is the same as described by referring to the locus position calculation section 24c. In step d, the provisional pivoting angles $\theta_{1r}$ and $\theta_{2r}$ for the first arm member 8 and second arm member 10 for realizing the instantaneous target position $(x_i, y_i)$ are calculated. The manner of the calculation done in this step is the same as described by referring to the pivoting angle calculation section 24d. In step e, as shown in detail in FIG. 6, signals $\theta_1$, $\theta_2$, $\alpha_1$, $\alpha_2$ and P produced by the angle gauges $E_1$ and $E_2$, accelerometers $A_1$ and $A_2$ and force sensor F are inputted, and, based on the inputted values, calculation is done by using the equations (1) to (4) to obtain the deflections $V_1$ and $V_2$ at the points $O_2$ and $O_3$ at the forward ends of the first arm member 8 and second arm member 10 and based on the values of $V_1$ and $V_2$, calculation is done by using the equations (5) and (6) to obtain the deflections $\Delta x$ and $\Delta y$ at the forward end $O_3$ of the second arm member 10. Further, based on these values and the values of $\theta_{1r}$ and $\theta_{2r}$ obtained in step d calculation is done by using the equations (7) to (10) to obtain correcting angles $\Delta\theta_1$ and $\Delta\theta_2$ for the first arm member 8 and second arm member 10 corresponding to the deflections $\Delta x$ and $\Delta y$, respectively.

In step f, the correcting angles $\Delta\theta_1$ and $\Delta\theta_2$ are added to the provisional pivoting angles $\Delta_{1r}$ and $\theta_{2r}$ to obtain corrected pivoting angles $\theta_{1r}+\Delta\theta_2$ and $\theta_{2r}+\Delta\theta_2$. In step g, the differences between the signals $\theta_1$ and $\theta_2$ outputted by the angle gauges $E_1$ and $E_2$ and the corrected pivoting angles $\theta_{1r}+\Delta\theta_1$ and $\theta_{2r}+\Delta\theta_2$ are obtained, and whether or not the difference is smaller than the allowance $\Delta\theta_a$ is judged. When the difference is found to be larger than the allowance $\Delta\theta_a$, the operation shifts to step h in which a signal corresponding to the differences is outputted to the servomechanism 26 to pivotally move the arm members 8 and 10. When the difference is found to become smaller than the allowance $\Delta\theta_a$ as the result of the pivotal movement of the arm members 8 and 10, the operation shifts to step i. In step i, the number i of the ith instantaneous target position is compared with the division number N, and when i=N, the operation is terminated. When i≠N, the operation returns to step c and the coordinate values of the next following instantaneous target position are calculated, and the same process as described hereinabove is repeated.

In the embodiment shown and described hereinabove, the signals $a_1$ and $a_2$ produced by the accelerometers $A_1$ and $A_2$ have been used to obtain angular accelerations $\ddot{\theta}_1$ and $\ddot{\theta}_2$ in the equations (1) and (2) used to calculate deflections at the deflection calculation section 24a. However, the angular accelerations $\ddot{\theta}_1$ and $\ddot{\theta}_2$ can be also be obtained by twice differentiating the values of the output signals $\theta_1$ and $\theta_2$ of the angle gauges $E_1$ and $E_2$. Thus, the accelerometers $A_1$ and $A_2$ can be done without. However, to increase the accuracy of the result of calculation of the angular accelerations, accelerometers had better been used. To obtain the angular velocities, calculation has been done to differentiate output signals $\theta_1$ and $\theta_2$ of the angle gauges $E_1$ and $E_2$. However, to increase the accuracy of the calculation, angular velocity meters may be provided to directly obtain the values of the angular velocities $\dot{\theta}_1$ and $\dot{\theta}_2$.

Figure 7:
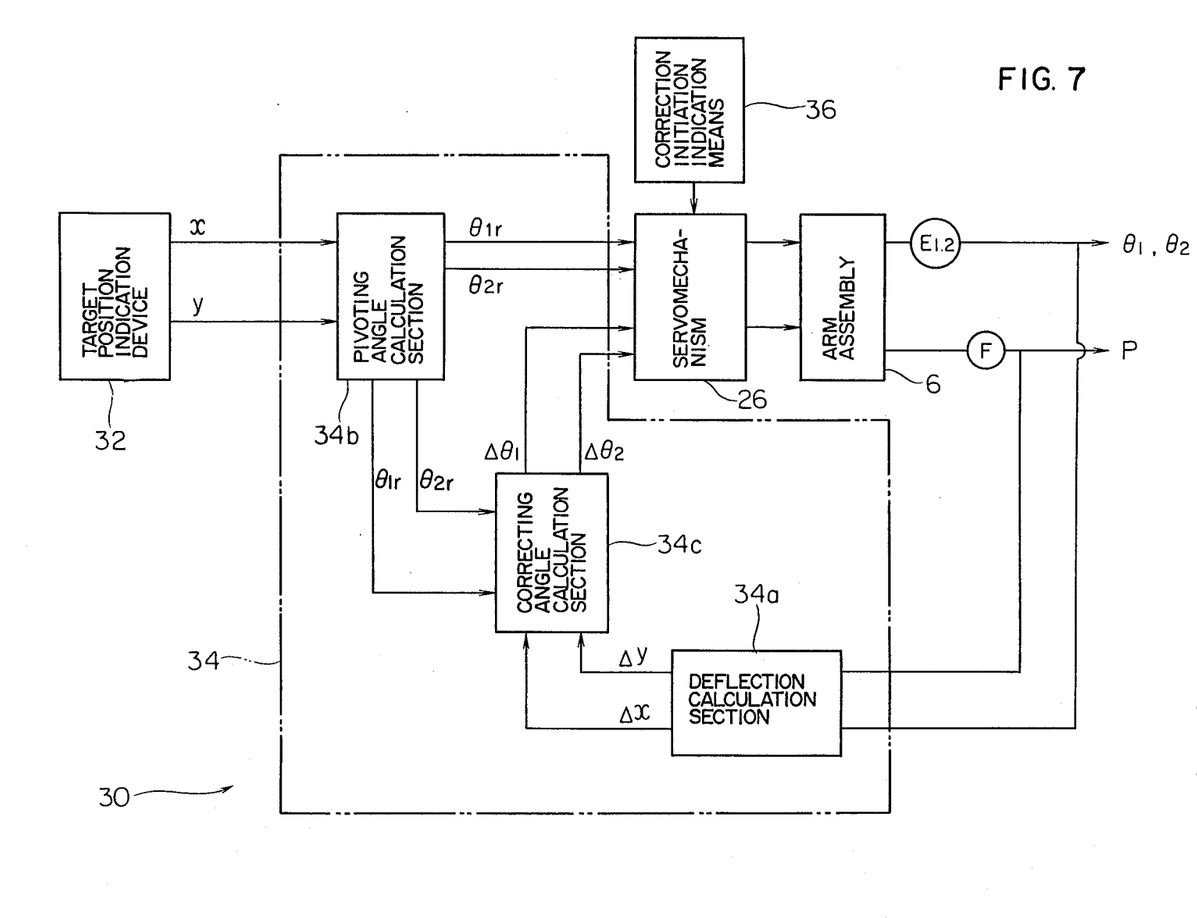
FIG. 7 is a block diagram showing the control system for positioning the forward end portion of the second arm member of the arm assembly of the working apparatus of pliable structure comprising another embodiment of the invention.

In the embodiment shown and described hereinabove, control of positioning the working point of the arm assembly 6 is effected to correct errors caused by the deflection of the arm assembly in positioning the forward end of the arm assembly 6 while the first arm member 8 and second arm member 10 are being pivotally moved. However, the invention is not limited to this specific mode of operation. To suit the type of the working apparatus of pliable structure and serve the purpose for which it is used, the first arm member 8 and second arm member 10 may be made first to be pivotally moved based on signals produced by the target position indicating device 22 and then, after temperarily stopping the operation of the first arm member 8 and second arm member 10, the positioning error caused by the deflection of the arm assembly 6 may be corrected. FIG. 7 shows a positioning control system 30 of another embodiment of the invention for effecting such control. In the system 30, a target position indication device 32 a deflection calculation section 34a, a pivoting angle calculation section 34b, and a correcting angle calculation section 34c of a control unit 34 are similar to the corresponding parts of the embodiment shown in FIG. 2. However, in the deflection calculation section 34a, deflections are calculated after the first arm member 8 and second arm member 10 have stopped operating, so that no dynamic load is applied. That is, in the equations (1) and (2) giving the torques $T_1$ and $T_2$, the angular accelerations $\ddot{\theta}_1$ and $\ddot{\theta}_2$ and the angular velocities $\dot{\theta}_1$ and $\dot{\theta}_2$ become zero, and only the final term having no angular accelerations and angular velocities remains. Thus, the accelerometers are done without. That is, in the embodiment shown in FIG. 8, only the static loads $W_1$ and $W_2$ are given by the equations (1) and (2). In this embodiment, since the deflection can be calculated while the arm assembly remains stationary, the deflection due to the own weight of the arm assembly and the deflection caused by an external load may be separately obtained by a process based on the science of the strength of materials and added to each other without using the equations (1) and (2).

The control system 30 comprises a correction initiation indication device 36 for indicating initiation of correction by using a signal $\Delta\theta_1$, $\Delta\theta_2$ from the correcting angle calculation section 34c after the pivotal movement of the first arm member 8 and second arm member 10 has been stopped. The servomechanism 26 is driven by the signal $\theta_{1r}$, $\theta_{2r}$ from the pivoting angle calculation device 34b before a signal from the correction initiation indication device 36 is supplied, but the servomechanism 26 is driven by the signal $\Delta\theta_1$, $\Delta\theta_2$ from the correcting angle calculation section 34c after the signal has been supplied.

In the embodiment shown in FIG. 7, the positioning error due to the deflections of the first arm member 8 and second arm member 10 are corrected as is the case with the embodiment shown in FIG. 2. Thus, it is possible to effect positioning the external load applied point $O_3$ with a high degree of accuracy and precision.

In the embodiments shown in FIGS. 2 and 7, the arm assembly 6 has been described as comprising the first arm member 8 and second arm member 10. However, the invention is not limited to this specific number of arm members, and the arm assembly may comprise three or more than three arm members, for example.

The arm members 8 and 10 have been described as being driven for pivotal movement by the hydraulic cylinders 12 and 14, respectively. However, this is not restrictive, and any actuators such as hydraulic motors may be used as actuators in place of the hydraulic cylinders 12 and 14. The arm members 8 and 10 may be driven, not hydraulically, but pneumatically or electrically as desired.

In the embodiments shown in FIGS. 2 and 7, the arm assembly 6 is constructed such that an external load is applied only to the working point of the second arm member 10. However, the invention is not limited to this specific construction of the arm assembly, and the first arm member 8 may support in a predetermined position a deck for an operator to stand and supervise the operation, so that an additional external load is applied to the arm assembly 6 in a portion thereof other than the forward end of the second arm member 10.

From the foregoing description, it will be appreciated that the working apparatus of pliable structure according to the invention is constructed such that the arm assembly can be positioned with a high degree of accuracy and precision by taking into consideration the deflections of the arm members, and this makes the working apparatus of pliable structure according to the invention suitable for use as working apparatus, such as construction machinery, which require elongated arms of light weight.

What is claimed is:

1. A working apparatus of pliable structure having a support and an arm assembly pivotally connected to said support, said arm assembly including at least a first arm member, connected at one end to said support, and a second arm member pivotally connected to the first arm member at respective arm member ends and each being pivotally moved by a first actuator and a second actuator, respectively, and at least said second arm member having a working point, corresponding to an arm member end other than the pivotally connected arm member end, to which an external load is applied, wherein said apparatus comprises:

angle sensor means for sensing pivoting angles of the first arm member and second arm member, respectively;

load sensor means for sensing the external load applied to the work point of the second arm member;

target position indication means for indicating the coordinate values of a target position of the working point of the second arm member; and control means including deflection calculation means for inputting signals produced by said angle sensor means and said load sensor means and calculating a deflection of the arm assembly at the working point of the second arm member; pivoting angle calculation means responsive to signals produced by the target position indication means for calculating provisional pivoting angles for the first arm member and second arm member corresponding to the target position when the arm assembly is assumed to produce no deflection; and correcting angle calculation means for inputting signals produced by the deflection calculation means and pivoting angle calculation means and calculating, as correcting angles, pivoting angles for the first arm member and second arm member corresponding to the deflection in the position of the provisional pivoting angles; and means for activating the first actuator and second actuator so as to pivotally move the first and second arm members, respectively, as determined by sums of the provisional pivoting angles and correcting angles, respectively, to thereby correct an error caused by the deflection of the arm assembly in positioning the working point of the second arm member for achieving accurate positioning thereof at the target position.

2. A working apparatus of pliable structure according to claim 1, wherein said control means further includes means for inputting the signals produced by the pivoting angle calculation means and correcting angle calculation means and calculating corrected pivoting angles for the first arm member and second arm member, respectively, which permit the working point of the second arm member to be positioned at said target position, said activating means being responsive to signals indicative of said corrected pivoting angles to actuate the first actuator and second actuator to thereby correct the positioning error caused by the deflection of the arm assembly while pivotally moving the first arm member and second arm member.

3. A working apparatus of pliable structure according to claim 1, wherein said control means further includes initial position calculation means responsive to the signals produced by said angle sensor means for calculating coordinate values of an initial position of the working point of the second arm member when said target position indication means produces the signal; locus position calculation means being responsive to the signals produced by said target position indication means and said initial position calculation means for calculating a multiplicity of coordinate values corresponding to instantaneous target positions on a locus between the initial position and target position and successively outputting signals indicative of the instantaneous target positions, said pivoting angle calculation means inputting the output signals of said target position indication means which have been processed by the locus position calculation means; adder means responsive to the signals produced by said pivoting angle calculation means and said correcting angle calculation means for calculating corrected pivoting angles by adding the correcting angles and the provisional pivoting angles; and comparator means responsive to the signals produced by said angle sensor means and said adder means for comparing the corrected pivoting angles and the actual angles in order to determine whether or not the difference between them is smaller than a predetermined allowable amount and outputting a renewal signal to the locus position calculation means when the difference is smaller than the allowable amount, said locus position calculation means being operative to change the signal indicative of the instantaneous target position to a new signal indicative of the next following instantaneous target position in response to said renewal signal and to desist from producing the signal when the final instantaneous target position is reached, to thereby enable correction of the positioning error caused by the deflection of the arm assembly while the first arm member and second arm member are being pivotally moved in response to the signal indicative of the corrected pivoting angle produced by said adder means.

4. A working apparatus of pliable structure according to claim 1, further comprising correction initiation indication means coupled to said actuating means for starting correction of the positioning error caused by the deflection of the arm assembly in such a manner that the first arm member and second arm member are first pivotally moved by a pivoting angle signal produced by said pivoting angle calculation means and then they are pivotally moved by the signal produced by said correcting angle calculation means to correct the positioning error after the pivotal movement of the first and second arm members caused by the pivoting angle signal has been terminated.

5. A working apparatus of pliable structure according to claim 1, wherein said deflection calculation means comprises means for calculating a torque of the arm assembly about a first pivoting point with respect to the support and a torque of the second arm member about a second pivoting point with respect to the first arm member when the arm assembly is in motion, to obtain from the torques the sum of the dynamic loads and static loads acting on the second pivoting point at the first arm member and on the working point of the second arm member, respectively, to calculate a deflection of the first arm member at the second pivoting point and a deflection of the second arm member at the working point thereof based upon the values of the sum and to calculate a deflection of the arm assembly at the working point corresponding to the two deflections.

6. A working apparatus of pliable structure according to claim 1, further comprising acceleration sensor means for sensing accelerations at a pivoting point of the second arm member with respect to the first arm member and at the working point of the second arm member, respectively, said deflection calculation means being responsive to signals outputted by said acceleration sensor means for calculation.

7. A working apparatus of pliable structure according to claim 1, wherein said first and second actuators comprise hydraulic means.

8. A working apparatus of pliable structure according to claim 1, wherein said first and second actuators each comprise a hydraulic cylinder.

* * * * *